US011693952B2

(12) United States Patent
Li et al.

(10) Patent No.: US 11,693,952 B2
(45) Date of Patent: Jul. 4, 2023

(54) SYSTEM AND METHOD FOR PROVIDING SECURE EXECUTION ENVIRONMENTS USING VIRTUALIZATION TECHNOLOGY

(71) Applicant: VMware, Inc., Palo Alto, CA (US)

(72) Inventors: Ye Li, Newton, MA (US); David Ott, Chandler, AZ (US); Andrei Warkentin, North Andover, MA (US); Cyprien Laplace, Boston, MA (US); Alexander Fainkichen, Southborough, MA (US)

(73) Assignee: VMWARE, INC., Palo Alto, CA (US)

( * ) Notice: Subject to any disclaimer, the term of this patent is extended or adjusted under 35 U.S.C. 154(b) by 104 days.

(21) Appl. No.: 16/177,258

(22) Filed: Oct. 31, 2018

(65) Prior Publication Data

US 2020/0134171 A1     Apr. 30, 2020

(51) Int. Cl.
*G06F 21/53*     (2013.01)
*G06F 21/51*     (2013.01)
*G06F 9/455*     (2018.01)

(52) U.S. Cl.
CPC .......... *G06F 21/53* (2013.01); *G06F 9/45558* (2013.01); *G06F 21/51* (2013.01); *G06F 2009/45587* (2013.01)

(58) Field of Classification Search
CPC ......... G06F 9/45558; G06F 2212/1052; G06F 12/1425; G06F 21/53; G06F 21/575; H04L 41/5041
See application file for complete search history.

(56) References Cited

U.S. PATENT DOCUMENTS

| | | | |
|---|---|---|---|
| 8,650,299 B1 * | 2/2014 | Huang | G06F 9/5077 709/226 |
| 9,246,690 B1 * | 1/2016 | Roth | G06F 21/53 |
| 9,442,752 B1 * | 9/2016 | Roth | G06F 9/45558 |
| 9,626,512 B1 * | 4/2017 | Brandwine | G06F 21/575 |
| 9,792,143 B1 * | 10/2017 | Potlapally | G06F 9/45558 |
| 10,635,821 B2 * | 4/2020 | Cheng | G06F 21/575 |
| 2009/0044187 A1 * | 2/2009 | Smith | G06F 21/53 718/1 |
| 2015/0033034 A1 * | 1/2015 | Gerzon | H04L 9/3239 713/190 |
| 2015/0089502 A1 * | 3/2015 | Horovitz | G06F 9/45558 718/1 |
| 2015/0304736 A1 * | 10/2015 | Lal | G06F 21/10 380/210 |
| 2017/0104597 A1 * | 4/2017 | Negi | H04L 9/0816 |
| 2017/0286721 A1 * | 10/2017 | Xing | G06F 21/74 |
| 2017/0372076 A1 * | 12/2017 | Poornachandran | G06F 21/74 |

(Continued)

OTHER PUBLICATIONS

Kanzari, Houssem et al. "Towards Management of Chains of Trust for Multi-Clouds with Intel SGX." 2016. (Year: 2016).*

(Continued)

*Primary Examiner* — Lewis A Bullock, Jr.
*Assistant Examiner* — Melissa A Headly
(74) *Attorney, Agent, or Firm* — Loza & Loza, LLP

(57) ABSTRACT

System and method for providing secure execution environments in a computer system uses an enclave virtual computing instance to create a secure execution environment, which is deployed in response to a request for such a secure execution environment for content from a software process running in the computer system.

10 Claims, 4 Drawing Sheets

(56) References Cited

U.S. PATENT DOCUMENTS

| | | | | |
|---|---|---|---|---|
| 2018/0114012 A1* | 4/2018 | Sood | ................. | G06F 21/53 |
| 2018/0211035 A1* | 7/2018 | Costa | ................. | H04L 9/0643 |
| 2018/0285560 A1* | 10/2018 | Negi | ................. | G06F 21/53 |
| 2018/0341768 A1* | 11/2018 | Marshall | ................. | G06F 21/53 |
| 2019/0114431 A1* | 4/2019 | Cheng | ................. | G06F 21/575 |
| 2019/0370467 A1* | 12/2019 | Li | ................. | H04L 9/3234 |
| 2020/0110886 A1* | 4/2020 | Moyer | ................. | G06F 21/602 |
| 2021/0037001 A1* | 2/2021 | Sapek | ................. | G06Q 20/4014 |

OTHER PUBLICATIONS

Intel; "Solware Guard Extensions Programming Reference"; Ref. #329298-001US; Sep. 2013; 156 pgs.

Intel; "Intel Architecture—Memory Encryption Technologies Specification"; Ref. #336907-001US; Rev: 1.1; Dec. 2-17; 30 pgs.

AMD; "AMD Secure Encrypted Virtualization (SEV)"; https://developer.amd.com/sev/; retrieved Jan. 28, 2019; 5 pgs.

\* cited by examiner

US 11,693,952 B2

SYSTEM AND METHOD FOR PROVIDING SECURE EXECUTION ENVIRONMENTS USING VIRTUALIZATION TECHNOLOGY

BACKGROUND

Developers of secure applications seek to protect selected code and data from disclosure or modification by processes running on the same system. Such processes may be running at the same or a higher privilege level. Example applications with these requirements include secure web browsing, digital rights management (DRM), and e-commerce applications.

To address this problem, the notion of a trusted execution environment, or TEE, has been developed in recent years. Broadly, a TEE provides a set of features or mechanisms that are useful in isolating code and data, and in verifying the integrity of what is running on the system. One recent development of interest is Intel® Software Guard Extension (SGX), which is a recent platform technology that implements a TEE solution entirely in hardware. Essentially, Intel® SGX supports the creation of isolated memory environments, or secure enclaves, that any application on the system can use to protect code and data from all other processes running on the system. Memory enclaves are encrypted and ensure confidentiality and code integrity even if the operating system is compromised. Attestation services are also provided by the SGX hardware to verify the authenticity of the platform and integrity of a given enclave. Performance is also an advantage of this hardware-based solution.

While Intel® SGX is a notable contribution to the TEE technologies, hardware-based solutions suffer from numerous disadvantages. Some of these disadvantages include (1) the slow pace of hardware feature development, release, and deployment, (2) security applications become tied to platform features that are hard to remediate if and when vulnerabilities are discovered, (3) TEE features, which are offered as a proprietary platform solution, are not universally available (often even across products offered by the same vendor, and (4) platform-based hardware solutions may lack cross-platform compatibility which is needed for infrastructure management solutions (e.g., hardware solutions may not support virtual machine (VM) migration of VMware products).

BRIEF DESCRIPTION OF THE DRAWINGS

Throughout the description, similar reference numbers may be used to identify similar elements.

DETAILED DESCRIPTION

Figure 1:
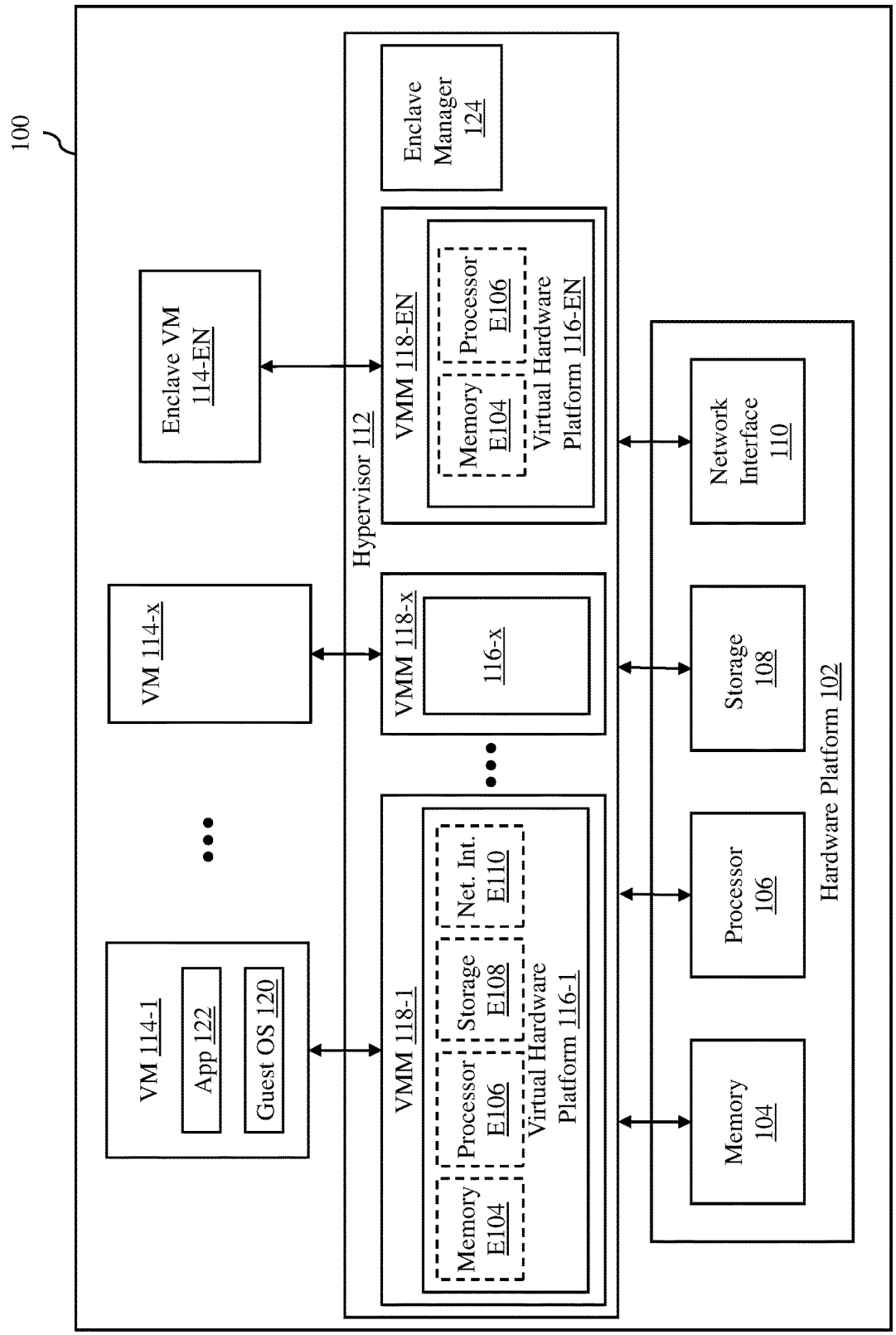
FIG. 1 is a block diagram of a computer system in accordance with an embodiment of the invention.

FIG. 1 depicts a computer system 100 in accordance with an embodiment of the invention. The computer system provides a software-based TEE solution that offers memory enclaves as secure execution environments using virtualization as the control and management engine. This software-based solution may leverage hardware virtualization and memory encryption features which are widely available on modern hardware platforms, but does not require any special hardware TEE features. The software-based solution provides the memory enclaves in a unified and highly available way, across multiple hardware platforms, and irrespective of whether the platform offers TEE features. Thus, the disadvantages and limitations of current hardware-based TEE solutions are mitigated using the software-based TEE solution of the computer system 100.

As shown in FIG. 1, the computer system 100 includes a physical hardware platform 102, which include components commonly found in a server-grade computer. The physical hardware platform 102 includes at least one or more system memories 104, one or more processors 106, a storage 108, and a network interface 110. Each system memory 104, which may be random access memory (RAM), is the volatile memory of the computer system 100. Each processor 106 can be any type of a processor, such as a central processing unit (CPU) commonly found in a personal computer. In an embodiment, at least one of the processors 106 of the computer system 100 may be a processor with virtualization features that can provide strong isolation of memory and code, such as Intel VT-x, AMD SVM, or ARMv8-A processor. The storage 108 can be any type of non-volatile computer storage with one or more storage devices, such as a solid-state devices (SSDs) and hard disks. Although the storage 108 is shown in FIG. 1 as being a local storage, in other embodiments, the storage 108 may be a remote storage, such as a network-attached storage (NAS). The network interface 110 is an interface that allows the computer system 100 to communicate with other devices through one or more computer networks. As an example, the network interface may be a network interface controller (NIC).

The computer system 100 further includes a virtualization software layer 112 running directly on the hardware platform 102 or on an operation system (OS) of the computer system. The virtualization software layer 112 can support one or more virtual computing instances (VCIs). In addition, the virtualization software layer 112 can deploy or create VCIs on demand. As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. The VM may be comprised of a set of specification and configuration files and is backed by the physical resources of a physical host computer. Every VM may have virtual devices that provide the same functionality as physical hardware and have additional benefits in terms of portability, manageability, and security. An example of a VM is the VM created using VMware vSphere® solution made commercially available from VMware, Inc of Palo Alto, Calif. A virtual container is a package that relies on virtual isolation to deploy and run applications that access a shared operating system (OS) kernel. An example of a virtual container is the virtual container created using a Docker engine made available by Docker, Inc. Although the virtualization software layer 112 may support different types of VCIs, the virtualization software layer will be described herein as supporting VMs.

In the illustrated embodiment, the virtualization software layer 112 is a hypervisor, which enables sharing of the hardware resources of the computer system 100 by VMs that are deployed by the hypervisor. One example of a hypervisor that may be used in an embodiment described herein is a VMware ESXi™ hypervisor provided as part of the VMware vSphere® solution made commercially available from VMware, Inc of Palo Alto, Calif.

The hypervisor 112 provides a device driver layer configured to map physical resources of hardware platform 102 to "virtual" resources of each VM supported by the hypervisor such that each VM has its own corresponding virtual hardware platform. Each such virtual hardware platform provides emulated or virtualized hardware (e.g., memory, processor, storage, network interface, etc.) that may, for example, function as an equivalent, conventional hardware architecture for its corresponding VM. In deploying VMs, the hypervisor 112 may also install user input device drivers in each VM so that user input devices, such as mice and keyboards, may be used with the VMs.

In FIG. 1, the computer system 100 is shown to include a number of VMs 114-1 to 114-x supported by the hypervisor 112. Each of these VMs has a virtual hardware platform 116. Thus, the VM 114-1 has the virtual hardware platform 116-1, while the VM 114-x has the virtual hardware platform 116-x. Each of the virtual hardware platforms includes at least emulated memory E104, emulated processor E106, virtual storage V108 and virtual network interface V110, which correspond to the memory 104, the processor 106, the storage 108 and the network interface 110, respectively, of the hardware platform 102 of the computer system 100 (not shown in FIG. 1 for the virtual hardware platform 116-x). The virtual hardware platforms 116-1 to 116-x may be considered part of virtual machine monitors (VMMs) 118-1 to 118-x that implement virtual system support to coordinate operations between the hypervisor 112 and corresponding VMs 114-1 to 114-x.

With the support of the hypervisor 112, the VMs 114-1 to 114-x provide isolated execution spaces for guest software. Each VM may include a guest operating system 120, and one or more guest applications 122. The guest operating system 120 manages virtual hardware resources made available to the corresponding VM by the hypervisor 112, and, among other things, the guest operating system forms a software platform on top of which the guest applications 122 run.

The computer system 100 with the deployed VMs 114-1 to 114-x may have various software processes running in the computer system. As used herein, software processes can be any software programs, applications or software routines that can run on one or more computers, which can be physical computers, virtual computers, such as VMs, or distributed computer systems. As an example, one or more software processes may be running on the host OS of the computer system 100, one or more software processes may be running on the guest OSs 120 of the VMs as guest applications 122, and one or more software processes may be running in the hypervisor 112. Some of these software processes may need to protect sensitive content, such as codes and/or data. As used herein, codes of sensitive content may refer to computer codes that can execute software routines, and data of sensitive content may refer to any confidential information, such as encryption keys.

In order to provide secure execution environments for these software processes, the computer system 100 includes an enclave manager 124, which may be running in the hypervisor 112 or in another part of the computer system. The enclave manager 124 operates to deploy one or more enclave VCIs, which may be specialized VCIs, in the computer system when one of the software processes requests a secure environment for codes and/or data. Although the enclave VCIs may be any type of VCIs, the enclave VCIs will be described herein as enclave VMs.

An enclave VM provides a secure environment to store any codes and/or data that need to be protected. An enclave VM is similar to a regular or normal VM. However, the enclave VM may be configured so that it requires minimal CPU and memory resources, requires no virtual devices, such as networking, storage, human devices, video graphics array (VGA) and other common VM virtual devices, and requires not operating system or other system software.

These simplifications to an enclave VM allow it to consume far less hardware resources than a conventional guest VM. Consequently, the hypervisor 112 can provision many more enclave VMs based on software process requests than conventional VMs. In addition, the provisioning time of each enclave VM is also dramatically decreased since no virtual device initialization and no system software initialization are required Eliminating virtual devices and system software also minimizes the size of the Trusted Computing Base (TCB) of the framework, an important consideration in trusted execution environments (TEEs) which seek to minimize the attack surface of the solution and to minimize the complexity of security validation.

To further increase the confidentiality of the enclave VMs, the enclave VMs may use generalized VM encryption technologies (e.g., technologies provided by AMD SEV and Intel MKTME) when they are available on the underlying hardware platform. When this feature is used, the confidentiality of an encrypted enclave VM can be maintained even against the hypervisor itself. This may be important in applications that demand strong privacy guarantees to comply with government or industry regulations in various contexts (e.g., defense or health care).

The enclave manager 124 operates to configure and deploy enclave VMs in response to requests from software processes, which may be part of applications 122 or other executing software programs. In an embodiment, the enclave VMs that are deployed with minimal virtual CPU and memory (e.g., a single virtual CPU with a couple of megabytes of memory) and no virtual devices, such as networking, storage, human devices, VGA and other common virtual devices found in VMs, and no operating system or other system software. The virtual CPU and memory for the enclave VMs can vary depending on the actual enclave demands from the software processes during the creation of the enclave VMs. Once the enclave VMs are deployed and operating, the enclave manager can load sensitive content, e.g., codes and/or data to be protected, in the virtual volatile memory of the enclave VMs so that the contents securely stored in the enclave VMs can then be safely used by the requesting software processes or other software processes to perform one or more tasks. In some embodiments, if the underlying hardware platform provides for VM encryption technology, data stored in the virtual volatile memory of the enclave VMs may be encrypted using the available VM encryption technology to ensure increased confidentiality of any content stored in the enclave VMs. After the tasks have been performed, the enclave VMs may be deleted by the enclave manager 124 if the enclave VMs are no longer needed by the requesting software processes or any other software processes.

In FIG. 1, one enclave VM 114-EN has been deployed in the computer system 100 and supported by the hypervisor 112. Thus, the hypervisor 112 includes a VMM 118-EN, which manages a virtual hardware platform 116-EN. In contrast to other virtual hardware platforms, the virtual hardware platform 116-EN for the enclave VM 114-EN includes only emulated volatile memory E104 and emulated processor E106. Thus, the virtual hardware platform 116-EN does not include any virtual non-volatile storage, virtual network interface or other virtual devices. In addition, the enclave VM does not include any system software, such as an operating system. Thus, the enclave VM 114-EN can be more readily deployed using less resources of the computer system 100 than standard guest VMs.

Figure 2:
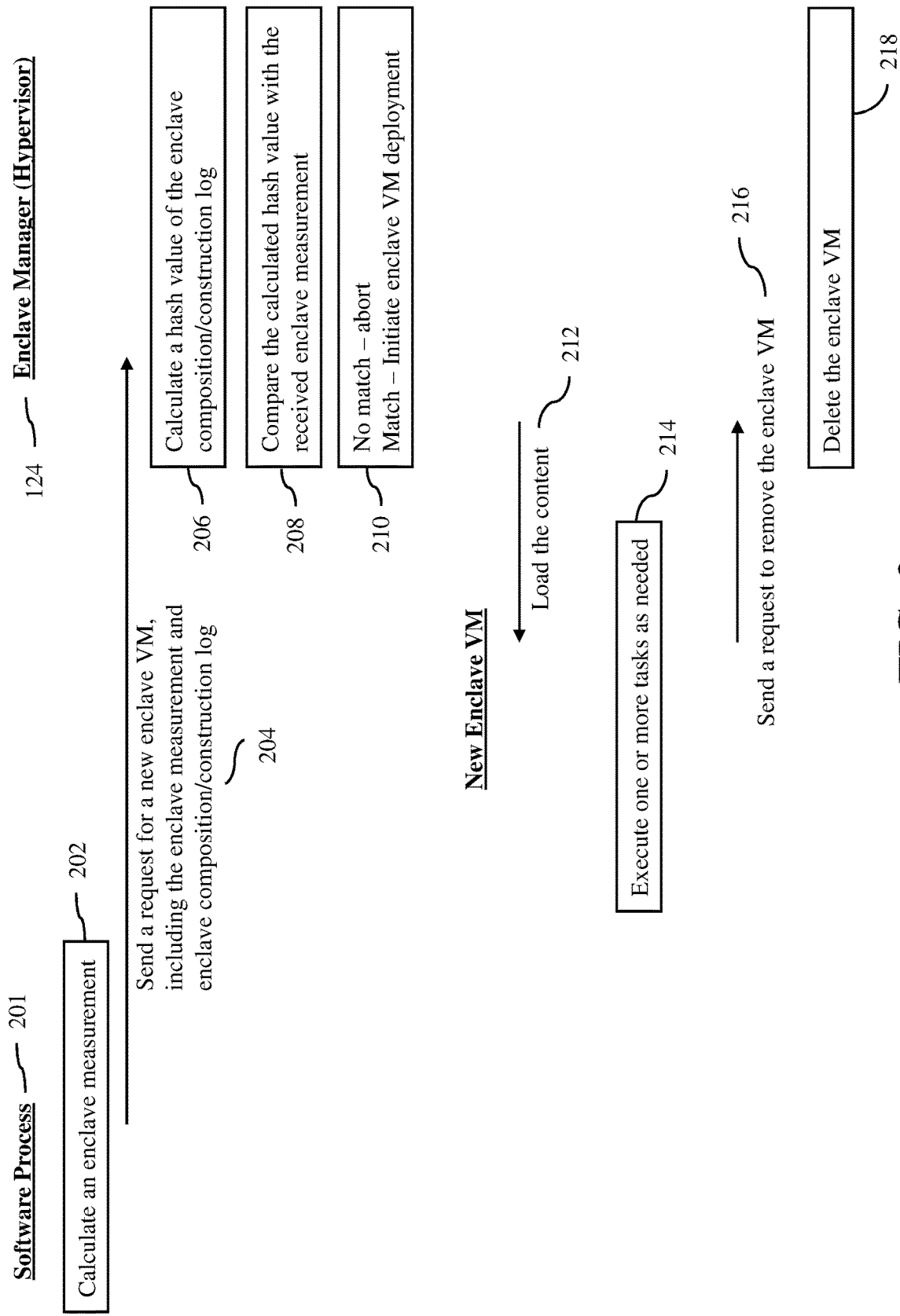
FIG. 2 is a swim lane diagram illustrating a process of employing an enclave virtual machine (VM) to provide a secure execution environment in the computer system of FIG. 1 in accordance with an embodiment of the invention.

A process of employing an enclave VM to provide a secure execution environment in the computer system 100 in accordance with an embodiment of the invention is now described with reference to a swim lane diagram of FIG. 2, which involves a software process 201 running in the computer system 100, the enclave manager 124 of the hypervisor 112 and an enclave VM. As shown in FIG. 2, at step 202, when the software process 201 needs a secure execution environment for a sensitive content, an enclave measurement is calculated by the software process. As used herein, an enclave measurement is information that can be used to unique identify an enclave or secure execution environment represented by an enclave composition/construction log, which includes (1) content to be stored in the secure execution environment or enclave, e.g., pages of both data and code to be stored, (2) the virtual address mapping of the enclave, and (3) any other security information from user configuration (e.g., page permissions). In an embodiment, the enclave measurement is a hash value of the enclave composition/construction log. In an alternative embodiment, the enclave composition/construction log may be in the form of an internal file. Next, at step 204, a request for a new enclave VM is sent to the enclave manager from the software process 201. In an embodiment, the enclave VM request includes the enclave measurement and the enclave composition/construction log.

Next, at step 206, a hash value of the received enclave composition/construction log is calculated by the enclave manager. Next, at step 208, this calculated hash value is then compared with the received enclave measurement to validate the received enclave composition/construction log. In the illustrated embodiment, the received enclave measurement is a hash value of the original enclave composition/construction log that was computed by the requesting software process 201. The operation then proceeds to step 210.

At step 210, if the hash value calculated by the enclave manager is not equal to the enclave measurement received from the requesting software process 201, the operation is aborted since this indicates that the received enclave composition/construction log is not identical to the original enclave composition/construction log due to some change, which may be the result of some error or unauthorized tampering.

However, at step 210, if the hash value calculated by the enclave manager is equal to the enclave measurement received from the requesting software process 201, a deployment of a new enclave VM for the software process is initiated by the enclave manager, which results in the enclave VM being created in the computer system 100 by the hypervisor 112. In an embodiment, the enclave VM is configured by the hypervisor to have minimal virtual CPU and memory with no virtual devices, such as networking, storage, human devices, VGA and other common VM virtual devices, and no operating system or other system software. In some embodiments, the enclave VM may be deployed with one or more software programs to enable communication and attestation functionalities, some of which are described below with respect to FIG. 3.

Next, at step 212, the content for the secure execution environment provided by the enclave VM is loaded into the enclave VM by the enclave manager. In an embodiment, the content is extracted from the enclave composition/construction log and loaded into the virtual volatile memory of the enclave VM using the virtual address mapping from the enclave composition/construction log. In addition, any other security information in the enclave composition/construction log is loaded into the enclave VM so that the security information can be implemented in the enclave VM. In some embodiments, one or more codes (i.e., software programs) may be also be loaded into the enclave VM.

Next, at step 214, one or more tasks are executed by the enclave VM as needed. The type of tasks executed by the enclave VM may vary depending on the application of the enclave VM. Some examples of these tasks include (1) communicating with the requesting software process 201 and/or other software processes, which may reside in the computer system 100 or in other computer systems, (2) executing the code originally loaded into the enclave VM using the data originally loaded into the enclave VM or using data from external sources, such as the requesting software process and/or other software processes, which may reside in the computer system or in other computer systems, and (3) executing code subsequently loaded into the enclave VM from external sources using the data originally loaded into the enclave VM or using data from external sources, such as the requesting software process and/or other software processes. In an embodiment, the execution of the code in the enclave VM may be preemptible. In this embodiment, the enclave VM is scheduled together with the requesting software process running on another "master" VM with respect to resource budget and usage by the hypervisor 112 since the enclave VM is serving the software process running on the master VM. This means that the code running in the enclave VM can be preempted by the requesting software process for higher priority events. Thus, the enclave execution may yield to higher priority events executed by the software process running on the "master" VM and resume after the higher priority events have been processed.

Next, at step 216, after the required tasks have been completed, a request to remove the enclave VM is sent to the enclave manager. In an embodiment, the required tasks are completed when a predefined number of tasks have been executed successfully. In other embodiments, the required tasks are completed when the requesting software process 201 no longer has any tasks that require the use of the enclave VM. Thus, the request to remove the enclave VM may come from the requesting software process or from the enclave VM itself.

Next, at step 218, in response to the received enclave VM removal request, a removal of the enclave VM is initiated by the enclave manager, which results in the enclave VM being deleted from the computer system 100 by the hypervisor 112.

A local attestation process for an enclave VM in the computer system 100 in accordance with an embodiment of the invention is now described with reference to FIG. 3. As described below, the attestation process of an enclave VM involves two enclave VMs, where one of the enclave VMs authenticates the other enclave VM so that communication and/or collaboration between the two enclave VMs can be executed in a secure manner. These enclave VMs may be created by the same software process or by different software processes to execute one or more tasks, which require the enclave VMs to communicate and/or collaborate with each other. Thus, in FIG. 3, two enclave VMs 302A and 302B are illustrated as an example. In this illustrated example, the enclave VM 302A is being authenticated by the enclave VM 302B, which involves the enclave manager 124 of the computer system 100. It is assumed here that some communication or collaboration is needed between the enclave VMs 302A and 302B to execute a task, and thus, these enclave VMs still exist in the computer system 100. The lifecycle of an enclave VM depends on the application but essentially until all desired tasks have been performed for that enclave VM.

Figure 3:
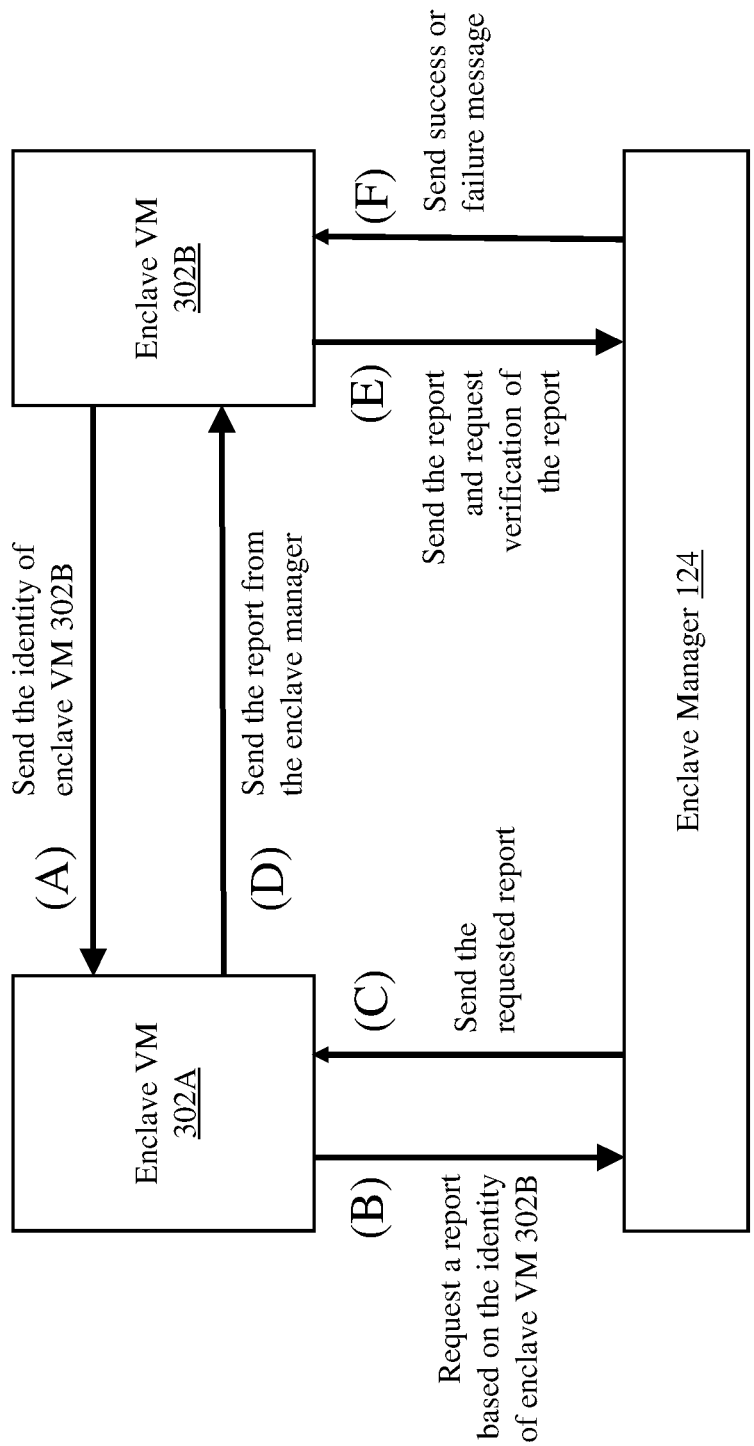
FIG. 3 illustrates a local attestation process of an enclave VM in accordance with an embodiment of the invention.

In FIG. 3, other components of the computer system 100 are not shown.

As shown in FIG. 3, at step (A), the enclave VM 302B sends its identity to the enclave VM 302A. In an embodiment, the identity of the enclave VM 302B is the enclave measurement of the enclave VM 302B, which may be a hash value of an enclave composition/construction log for the enclave VM 302B. The transmission of the identity of the enclave VM 302B from the enclave VMs 302B to the enclave VM 302A may be through any communication channel, even a communication channel that is not considered to be secure.

Next, at step (B), the enclave VM 302A requests the enclave manager 124 to generate a report based on the identity of the enclave VM 302B.

At step (C), in response to the report request from the enclave VM 302A, the enclave manager 124 generates the report based on a hypervisor root key, which is also used by the enclave VM 302A as its root key, and sends the report to the enclave VM 302A. The report includes an authentication data generated using a report key derived from the hypervisor root key. In an embodiment, the hypervisor root key may be stored in hardware leveraging Trusted Platform Module (TPM) key storage.

Next, at step (D), the enclave VM 302A sends the report received from the enclave manager 124 to the enclave VM 302B through any communication channel, which may be the same communication channel used to send the identity of the enclave VM 302B to the enclave VM 302A from the enclave VM 302B.

Next, at step (E), the enclave VM 302B then sends the report back the enclave manager 124 with a request to verify the authenticity of the report.

Next, at step (F), in response to the authentication request, the enclave manager 124 sends a message to the enclave VM 302B that indicates whether the authentication was a success (i.e., the report is determined to be authentic) or a failure (i.e., the report is determined to be not authentic). The authentication involves generating an authentication data using a report key derived from the hypervisor root key, which is the root key for the enclave VM 302B, that is compared to the signature found in the report to determine whether the root key for the enclave VM 302A is same as the root key for the enclave VM 302B. If the report is determined to be authentic, i.e., the root keys for the enclave VMs 302A and 302B are the same, this indicates that the enclave VM 302A is running on the same and authentic platform on which the enclave VM 302B is running. Thus, the enclave VM 302B can locally attest to the authenticity of the enclave VM 302A.

In an embodiment, the report generated by the enclave manager 124 includes (1) the identity of the enclave VM 302B, which is a hash value, (2) optional user data, which serves as a message tagging along the attestation process, and (3) a hash of (1) and (2) using a special report key, which is derived from the hypervisor root key and the identity of the enclave VM 302A. The optional user data is provided by the enclave VM 302A. In an embodiment, the process of authenticating the report by the enclave manager 124 involves using its hypervisor root key and the identity of the enclave VM 302B to derive a report key and a hash of (1) and (2) of the report. This hash is then used to compare to the hash (3) of the report to see whether the two hashes match. If the two hashes match, this indicates that the root key of the enclave VM 302A is the same as the root key of the enclave VM 302B, which means that the enclave VMs 302A and 302B are running on the same platform. Since the enclave VM 302B assumes that it is running on an authentic platform, the enclave VM 302B can now trust that the enclave VM 302A is also running on the same authentic platform. This embodiment of the attestation process is similar to the attestation process used in conventional Intel® Software Guard Extension (SGX). However, in this embodiment, the operations of the attestation process are handled in software rather than hardware.

This attestation process can also be used in the reverse direction for the enclave VM 302A to authenticate the enclave VM 302B. Thus, as long as there are multiple enclave VMs in the computer system 100, the enclave VMs can attest to each other to ensure that the enclave VMs running in the computer system are running on the same and authentic platform. Since attestation is needed when one enclave VM needs to communicate or collaborate with another enclave VM, when there is only one enclave VM, there is no need for attestation.

Figure 4:
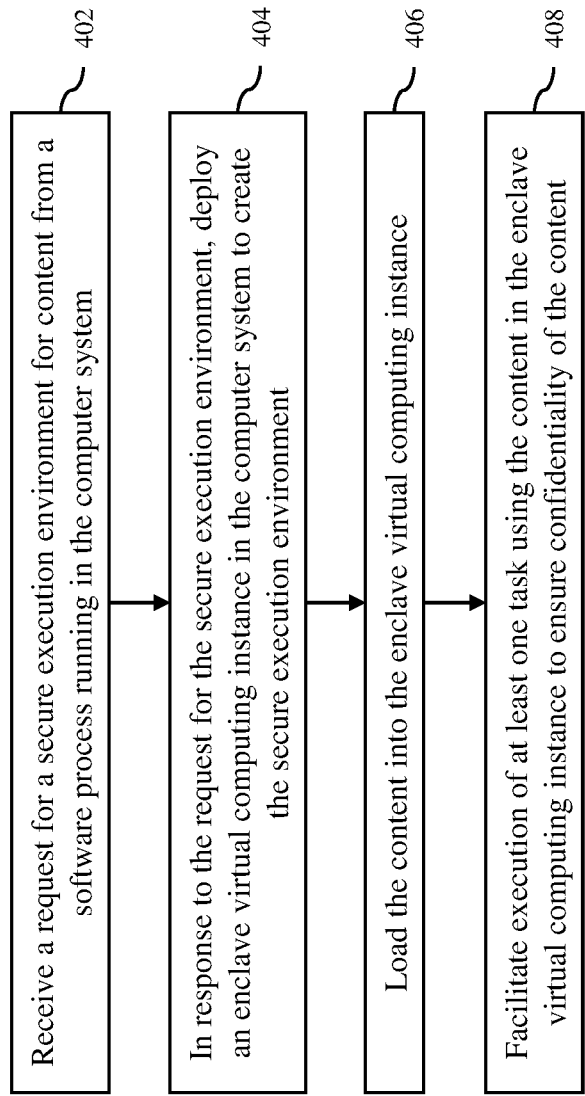
FIG. 4 is a flow diagram of a method for providing secure execution environments in a computer system in accordance with an embodiment of the invention.

A computer-implemented method for providing secure execution environments in a computer system in accordance with an embodiment of the invention is described with reference to a flow diagram of FIG. 4. At block 402, a request to create a secure execution environment for content is received from a software process running in the computer system, e.g., the request is received at an enclave manager of a hypervisor in the computer. At block 404, in response to the request for the secure execution environment, an enclave virtual computing instance is deployed in the computer system to create the secure execution environment. The enclave virtual computing instance includes at least virtual processor and virtual volatile memory without any virtual non-volatile storage. In an embodiment, the enclave manager may initiate the deployment of the enclave virtual computing instance, which is executed by the hypervisor. At block 406, the content is loaded into the deployed enclave virtual computing instance. At block 408, execution of at least one task is facilitated using the content in the enclave virtual computing instance to ensure confidentiality of the content.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for providing secure execution environments in a computer system, the method comprising:
   receiving a secure execution environment creation request, from a software process running in a virtual machine in the computer system, to create a secure execution environment for content, wherein the virtual machine includes at least virtual processor, virtual volatile memory and virtual non-volatile storage, wherein the secure execution environment creation request includes a measurement and an enclave composition/construction log associated with the secure execution environment being requested, the enclave composition/construction log including at least the content, the measurement including information that uniquely identifies the enclave composition/construction log, and wherein the measurement includes a hash value of the enclave composition/construction log;
   calculating a new hash value of the received enclave composition/construction log and comparing the new hash value with the received measurement, wherein the comparing validates the received enclave composition/construction log;
   in response to the request for the secure execution environment and the new hash value being equal to the received measurement, deploying a new enclave virtual machine in the computer system, and creating the secure execution environment in the new enclave virtual machine the new enclave virtual machine including at least virtual processor and virtual volatile memory without any virtual non-volatile storage, without any virtual networking interface and without any operating system, the virtual processor of the new enclave virtual machine being an emulated resource corresponding to a physical processor resource of the computer system, and the virtual volatile memory of the new enclave virtual machine being an emulated resource corresponding to a physical volatile memory resource of the computer system;
   performing an attestation process for the new enclave virtual machine using another enclave virtual machine to authenticate the new enclave virtual machine with a hypervisor root key;
   loading the content from the enclave composition/construction log into the virtual volatile memory of the new enclave virtual machine;
   executing of at least one task using the content in the new enclave virtual machine; and
   deleting the new enclave virtual machine from the computer system after the at least one task has been performed in the new enclave virtual machine.

2. The method of claim 1, wherein the content includes at least one of computer code and data.

3. The method of claim 1, wherein loading the content into the new enclave virtual machine includes encrypting the content using memory encryption technology provided by a processor of the computer system to store the content in the virtual volatile memory of the new enclave virtual machine.

4. The method of claim 1, wherein performing the attestation process for the new enclave virtual machine includes determining whether the new enclave virtual machine and the another enclave virtual machine are running on the same authentic platform.

5. The method of claim 4, wherein performing the attestation process for the new enclave virtual machine comprises:
sending an identity of the another enclave virtual machine to the new enclave virtual machine from the another enclave virtual machine;
requesting a report from an enclave manager in the computer system by the new enclave virtual machine;
receiving the report from the enclave manager at the new enclave virtual, the report being generated using a hypervisor root key associated with the new enclave virtual;
sending the report back to the enclave manager via the another enclave virtual machine;
and authenticating the report using a hypervisor root key associated with the another enclave virtual machine, including determining whether the hypervisor root key associated with the new enclave virtual machine matches the hypervisor root key associated with the another enclave virtual machine.

6. A non-transitory computer-readable storage medium containing program instructions for method for providing secure execution environments in a computer system, wherein execution of the program instructions by one or more processors of the computer system causes the one or more processors to perform steps comprising:
receiving a secure execution environment creation request, from a software process running in a virtual machine in the computer system, to create a secure execution environment for content, wherein the virtual machine includes at least virtual processor, virtual volatile memory and virtual non-volatile storage, wherein the secure execution environment creation request includes a measurement and an enclave composition/construction log associated with the secure execution environment being requested, the enclave composition/construction log including at least the content, the measurement including information that uniquely identifies the enclave composition/construction log, and wherein the measurement includes a hash value of the enclave composition/construction log;
calculating a new hash value of the received enclave composition/construction log and comparing the new hash value with the received measurement, wherein the comparing validates the received enclave composition/construction log;
in response to the request for the secure execution environment and that the new hash value being equal to the received measurement, deploying a new enclave virtual machine in the computer system and creating the secure execution environment in the new enclave virtual machine, the new enclave virtual machine including at least virtual processor and virtual volatile memory without any virtual non-volatile storage, without any virtual networking interface and without any operating system, the virtual processor of the new enclave virtual machine being an emulated resource corresponding to a physical processor resource of the computer system, and the virtual volatile memory of the new enclave virtual machine being an emulated resource corresponding to a physical volatile memory resource of the computer system;
performing an attestation process for the new enclave virtual machine using another enclave virtual machine to authenticate the new enclave virtual machine with a hypervisor root key;
loading the content from the enclave composition/construction log into the virtual volatile memory of the new enclave virtual machine;
executing of at least one task using the content in the new enclave virtual machine; and
deleting the new enclave virtual machine from the computer system after the at least one task has been performed in the new enclave virtual machine.

7. The computer-readable storage medium of claim 6, wherein the content includes at least one of computer code and data.

8. The computer-readable storage medium of claim 6, wherein loading the content into the new enclave virtual machine includes encrypting the content using memory encryption technology provided by a processor of the computer system to store the content in the virtual volatile memory of the new enclave virtual machine.

9. A computer system comprising:
memory;
a virtualization software that can support a plurality of virtual machines; and
at least one processor configured to:
receive a secure execution environment creation request, from a software process running in a virtual machine in the computer system, to create a secure execution environment for content, wherein the virtual machine includes at least virtual processor, virtual volatile memory and virtual non-volatile storage, wherein the secure execution environment creation request includes a measurement and an enclave composition/construction log associated with the secure execution environment being requested, the enclave composition/construction log including at least the content, the measurement including information that uniquely identifies the enclave composition/construction log, and wherein the measurement includes a hash value of the enclave composition/construction log;
calculate a new hash value of the received enclave composition/construction log and compare the new hash value with the received measurement, wherein a comparison of the new hash value with the received measurement validates the received enclave composition/construction log;
in response to the request for the secure execution environment, deploy a new enclave virtual machine in the computer system and create the secure execution environment in the new enclave virtual machine, the new enclave virtual machine including at least virtual processor and virtual volatile memory without any virtual non-volatile storage, without any virtual networking interface and without any operating system, the virtual processor of the new enclave virtual machine being an emulated resource corresponding to a physical processor resource of the computer system, and the virtual volatile memory of the new enclave virtual machine being an emulated resource corresponding to a physical volatile memory resource of the computer system, wherein the new enclave virtual is a same type of isolated software entity as the virtual without any virtual nonvolatile storage, without any virtual networking interface and without any operating system;

perform an attestation process for the new enclave virtual machine using another enclave virtual machine to authenticate the new enclave virtual machine with a hypervisor root key;

load the content from the enclave composition/construction log into the virtual volatile memory of the new enclave virtual machine;

execute at least one task using the content in the new enclave virtual machine; and delete the new enclave virtual machine from the computer system after the at least one task has been performed in the new enclave virtual machine.

10. The computer system of claim 9, wherein the at least one processor is further configured to encrypt the content using memory encryption technology provided by a processor of the computer system to store the content in the virtual volatile memory of the new enclave virtual machine.

\* \* \* \* \*